United States Patent [19]
Lee et al.

[11] Patent Number: 5,421,002
[45] Date of Patent: May 30, 1995

[54] METHOD FOR SWITCHING BETWEEN REDUNDANT BUSES IN A DISTRIBUTED PROCESSING SYSTEM

[75] Inventors: Paul O. Lee, Laurel; Andrew J. Turgeon, Sykesville, both of Md.

[73] Assignee: Westinghouse Electric Corporation, Pittsburgh, Pa.

[21] Appl. No.: 743,467

[22] Filed: Aug. 9, 1991

[51] Int. Cl.6 .............................................. G06F 11/00
[52] U.S. Cl. ................................. 395/575; 371/16.1; 371/11.3
[58] Field of Search ................. 371/29.5, 7, 8.1, 8.2, 371/9.1, 11.2, 11.3, 15.1, 16.1; 395/575

[56] References Cited

U.S. PATENT DOCUMENTS

| | | | |
|---|---|---|---|
| 4,127,768 | 11/1978 | Negi et al. | 235/304.1 |
| 4,583,222 | 4/1986 | Fossum et al. | 371/16.1 |
| 4,589,066 | 5/1986 | Lam et al. | 371/47 |
| 4,881,230 | 11/1989 | Clark et al. | 371/8.2 |
| 4,885,739 | 12/1989 | Read et al. | 370/58.1 |
| 4,991,174 | 2/1991 | Mori et al. | 371/15.1 |
| 5,091,847 | 2/1992 | Herbermann | 371/8.2 |
| 5,157,781 | 10/1992 | Harwood et al. | 371/22.3 |
| 5,276,823 | 1/1994 | Cutts, Jr. | 395/575 |

FOREIGN PATENT DOCUMENTS

2166271 4/1986 United Kingdom.

Primary Examiner—Hoa T. Nguyen

[57] ABSTRACT

When an error is detected during transmission of data in a distributed processing system having redundant unidirectional circulating buses, an error procedure is entered in each of the processors detecting the error. In the procedure, a testing processor transmits a test message to itself, first on the active bus and then on the inactive bus if the test message is unsuccessfully transmitted on the active bus. If the test message is successfully transmitted on the inactive bus, the active and inactive buses are switched and a fault is declared on the previously active bus. Other processors receiving the fault signal perform the same tests themselves and switch to the previously inactive bus if their test of the active bus is also unsuccessful. If the test of the active bus was successful, a second test is performed and if that is also successful, operation is resumed on the active bus. If the tests on both buses are unsuccessful operation also resumes on the originally active bus. This avoids repeated switching between buses.

4 Claims, 3 Drawing Sheets

METHOD FOR SWITCHING BETWEEN REDUNDANT BUSES IN A DISTRIBUTED PROCESSING SYSTEM

BACKGROUND OF THE INVENTION

1. Field of the Invention

The present invention is directed to redundant buses in a computer system and, more particularly, to the operation of switching between such buses when an error is detected on one of the buses.

2. Description of the Related Art

In highly reliable computer systems, redundant components are used to enable operation to continue even if one component fails. In the case of distributed processing systems, many processors are connected via a bus structure to operate faster with increased reliability. To further improve the reliability of such systems, redundant buses are used, typically having one bus in an active state with all communication on the active bus and another bus on standby in an inactive state.

When a fault is detected on the active bus, it is necessary to switch operation to the inactive bus and indicate the failure of the active bus so that repairs can be made. In a computer system having a master processor, switching from one bus to another is performed under the control of the master processor. However, use of a master processor leads to reduced redundancy (system operation is severely affected if the master processor fails) or problems associated with passing control from one processor currently acting as the master processor to another processor. In a distributed processing system in which all processors are independent, coordinating a switch from an active bus to an inactive bus is not as simple. It is important to avoid having a single point of failure lock up the system or to have the processors constantly switching back and forth between buses. Furthermore, typically only one bus is permitted to be active at a time and if some processors are using one bus while other processors are using another bus, all of the processors cannot communicate with each other.

SUMMARY OF THE INVENTION

An object of the present invention is to provide a method for smoothly switching between redundant buses in a computer system.

Another object of the present invention is to provide a coordinated bus switchover by independent processors in a distributed processing system.

A further object of the present invention is to maintain operation of a distributed processing system without a single point of failure seriously affecting operation of the system.

The above objects are attained by providing a method of switching between redundant unidirectional circulating buses connecting distributed processors, starting with the step of detecting at least one data transmission error on a currently active bus by at least one of the distributed processors and transmitting a test message from a testing processor to the testing processor via the currently active bus, using each of the distributed processors which detected the data transmission error as the testing processor. Next, each of the distributed processors used as the testing processor independently evaluates successful transmission of their test message and if the evaluation determines that the test message transmission was unsuccessful, the test message is transmitted from the testing processor to the testing processor via a currently inactive bus. Next, each of the distributed processors used as the testing processor to test the currently inactive bus independently evaluates successful transmission of their test message on the current inactive bus. If the evaluation determines that the transmission of the test message on the currently inactive bus was successful, each of the distributed processors acting as the testing processor independently switches use of the currently active bus and currently inactive bus to use as an inactive bus and an active bus, respectively, and outputs a fault signal indicating the switch in operation. If the evaluation of the currently active bus indicates successful transmission of the test message, normal operation continues by each of the distributed processors acting as the testing processor. On the other hand, if the test message transmission on both the currently active bus and the currently inactive bus is unsuccessful, switching between buses is prevented in each of the distributed processors acting as the testing processor.

The testing process described above is performed whenever an error is detected by one of the distributed processors during its own operations, or a fault signal is detected from another processor indicating switching from one bus to another. A data transmission error may be detected either during normal operation or during periodic testing of the bus which is performed by a processor sending a message to itself.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

Figure 1:
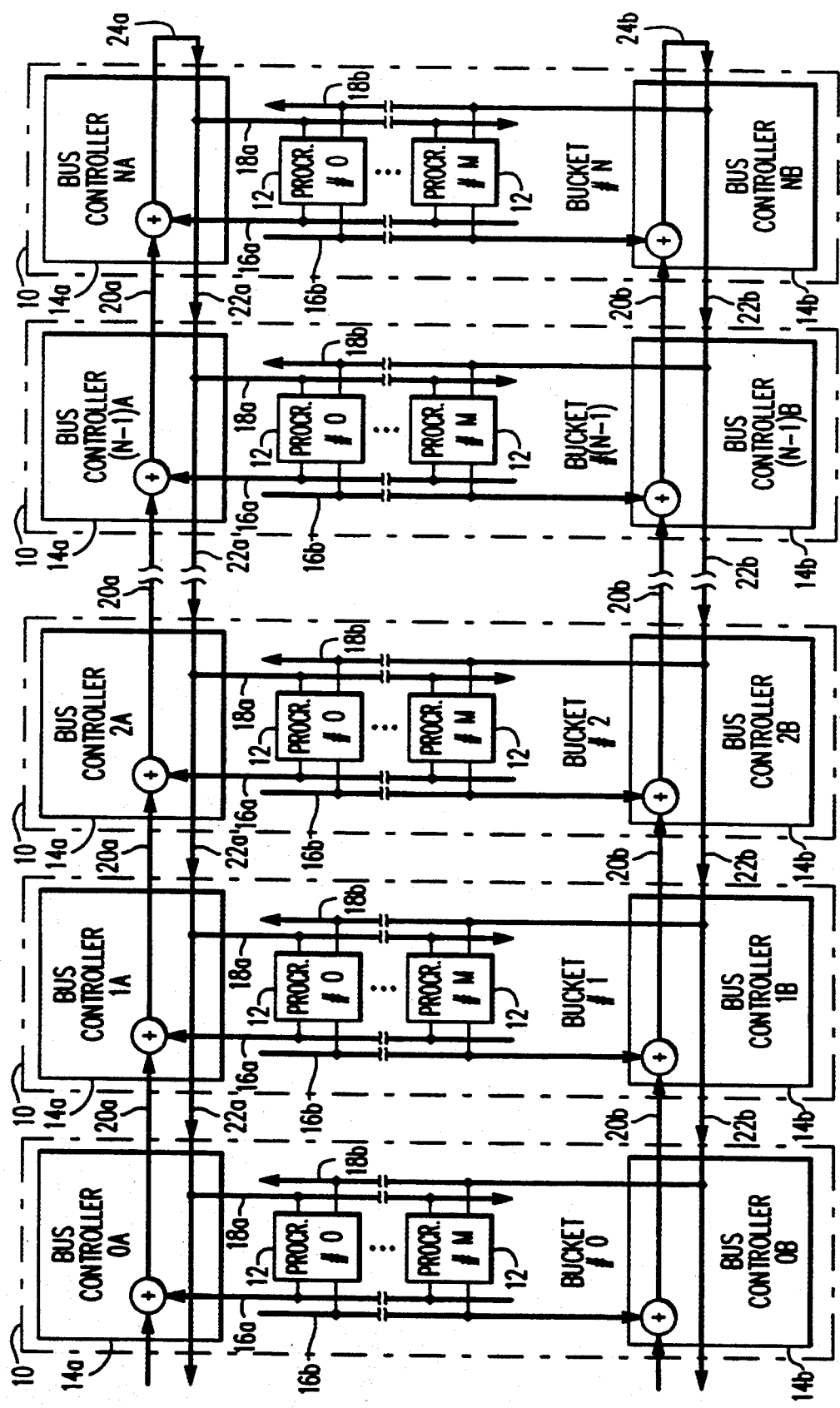
FIG. 1 is a block diagram of a distributed processing system to which the present invention can be applied.

The present invention can be applied to many different computer systems having redundant buses. One example of such a system is illustrated in FIG. 1. The system illustrated in FIG. 1 is described in more detail in co-pending applications filed on the same day as this application and incorporated herein by reference, entitled REDUNDANT SYNCHRONOUS MESSAGE BUS ARCHITECTURE, Ser. No. 07/743,488 by Mark Hayman and Paul Lee; TIME DIVISION MULTIPLEX VOICE DATA BUS, Ser. No. 07/743,477, now U.S. Pat. No. 5,235,594 by Paul Lee; DISTRIBUTED PROCESSING TELECOMMUNICATION SWITCH WITH STANDARD UNITS, Ser. No. 07/743,476, Younkin and Stephen Wigler, all of which are commonly owned with the present invention.

The distributed processing system illustrated in FIG. 1 is arranged in N buckets 10 of M processor modules 12. Each bucket 10 corresponds to a physically separate cabinet and includes two bus controllers 14 and two module collection and distribution buses 16, 18. Because redundant controllers and buses are used in this invention, an "a" or a "b" has been added to the item numbers for these components in FIG. 1 to illustrate this redundancy. In the following description and in FIG. 2, a reference to a bus or controller item number without the added "a" or "b" applies to either of the corresponding buses or controllers of FIG. 1. For example, the controller 14 of FIG. 2 can be either of the controllers 14a or 14b of FIG. 1. Each set of buses 16, 18 is connected to a different bus controller 14. For example, in bucket #1 (second from the left) the bus controller 14a for the A bus is connected to a module collection bus 16a and a distribution 18a, while the bus controller 14b for the B bus is connected to a module collection bus 16b and a module distribution bus 18b. The bus controllers 14 in the other buckets 10 are similarly connected to module collection buses 16 and module distribution buses 18.

The bus controllers 14a for the A bus are connected together by bucket collection buses 20a and bucket distribution buses 22a, while the bus controllers 14b for the B bus are connected together by pairs of bucket collection and distribution buses 20b and 22b. The bus controllers 14a, 14b in the final collection bucket #N are connected to return buses 24a, 24b.

The entire bus structure illustrated in FIG. 1 forms redundant unidirectional circulating buses where data flows in the direction indicated by the arrows. There are no return buses 24 connected to the bus controllers 14 in bucket #0. Data is output from the processor module 12 to the module collection buses 16 and added together with data from any previous buckets in the bus controller 14 for output on the bucket collection bus 20. Thus, the data output from the bus controller 14 in bucket #0 contains only data from the processor modules in bucket #0, while the data output to the return bus 24 by the bus controller 14 in bucket #N contains all of the data from all of the buckets 10 in one frame. This data is transmitted the full length of the bucket distribution bus 22 and to all of the module distribution buses 18. In the embodiment described in the related applications, the system operates on a 6.144 MHz clock with a maximum number of 128 processor modules, each outputting six bytes of data every 125 $\mu$sec. However, the present invention is not limited to this specific bus structure or operation speed, but is applicable to any redundant bus structure in a distributed processing system in which a processor can test the operation of the bus by transmitting a message to itself.

Figure 2:
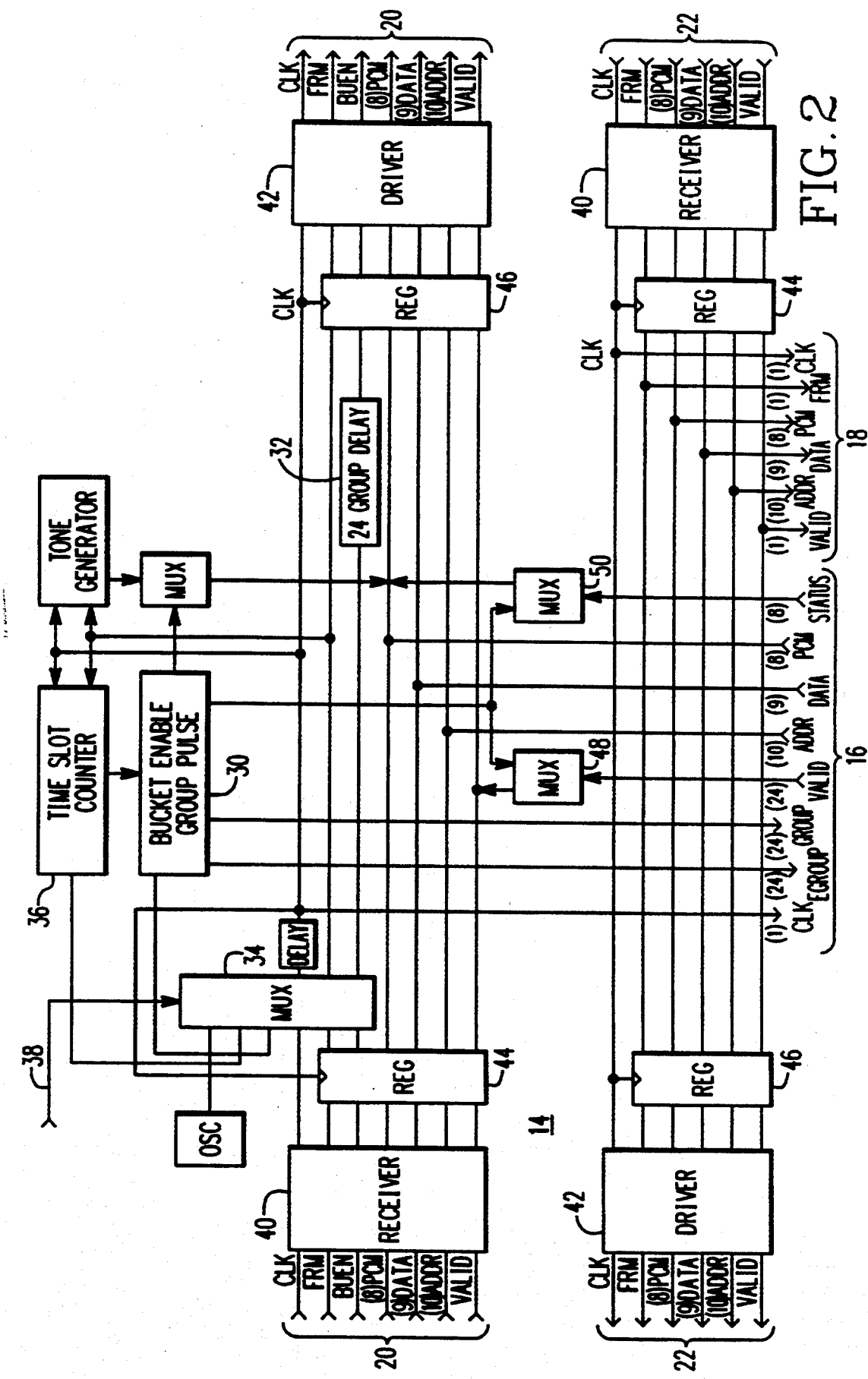
FIG. 2 is a block diagram of a bus controller in the system illustrated in FIG. 1.

In the illustrated embodiment, the transmission of messages is accomplished by combining messages from one bucket 10 to other messages already on the bucket collection bus 20 in the bus controllers 14. The bus controllers 14 are constructed as simply as possible to minimize the likelihood of failure. An embodiment of a bus controller 14 illustrated in FIG. 1 is illustrated in FIG. 2. A bucket enable pulse generated by circuit 30 has a length equal to the length of the message space for one processor module 12 (6 bytes) times the maximum number (M) of processor modules 12 in a bucket 10. In the embodiment illustrated in FIG. 1, the maximum number of processor modules 12 in a bucket 10 is twenty-four and a corresponding twenty-four group delay circuit 32 is provided to delay propagation of the bucket enable pulse to the next bus controller 14 until after all of the data has been collected from the processor modules 12 in the bucket 10.

The bucket enable pulse from circuit 30 is applied to a multiplexer 34. A time slot counter 36 determines when the bucket enable pulse is to be generated and supplied to the multiplexer 34. A control signal 38 determines whether the multiplexer 34 selects the bucket enable pulse from the circuit 30 or the bucket enable signal BUEN on the bucket distribution bus 20. The control signal 38 may be made by any control means, such as a jumper connected to either ground or a power supply line, such as +5 volts. All of the bus controllers 14 except the bus controllers 14 in the initial bucket 10, i.e., bucket #0, will have the same signal (e.g., ground) supplied to the multiplexer 34. Only the bus controllers 14 in bucket #0 will have a control signal 38 supplied to the multiplexer 34 indicating selection of the bucket enable pulse from circuit 30.

During the presence of the bucket enable pulse, control signals are output to the processor modules 12 on the module collection bus 16. These control signals are generated by the bucket enable group pulse circuit 30 and include EGROUP and GROUP signals. As indicated in FIG. 2, there is one EGROUP signal and one GROUP signal for each of the processor modules 12 in a full bucket 10, for a total of 24 signals each. The EGROUP and GROUP signals enable the output and drive the drivers of the processor modules 12 one at a time. This prevents a failure of one of the processor modules 12 from locking up the module collection bus 16.

Each bus controller 14 has two sets of receivers 40 and drivers 42. One set is connected to the bucket collection bus 20 and the other to the bucket distribution bus 22. Registers 44, 46 hold the data received by the receivers 40 and transmitted by the drivers 42, respectively. Validity and status signals on the module collection bus 16 are received from the processor modules 12. Multiplexers 48, 50 select the signal from the processor module 12 currently outputting data and add this signal as a one bit signal to the data on the bucket collection bus 20.

Just as in the case of the overall construction of the distributed processing system illustrated in FIG. 1, any conventional technique for combining messages from a processor or group of processors on a ring bus may be used. For example, the technique disclosed U.S. Pat. No. 4,663,706 which includes parallel-to-serial conversion, so that optical fibers transmitting data in serial can be used for the bucket collection and distribution buses 20, 22 could replace the bus controllers 14 constructed as illustrated in FIG. 2.

According to the present invention, the state of each bus is maintained in each of the distributed processors. There are eight possible states represented by States 0 through 7 in the Appendix. When certain types of messages are transmitted from one processor 12 to another, acknowledgement of safe receipt of the message is required. If a message is not received by the initiating processor from the destination processor, the initiating processor enters an error routine. In the preferred embodiment the error routine is not entered after a single failure of the message, the message is retransmitted one or two times before failure of transmission is assumed; only then is the error routine invoked. Also, the programs executed by each of the processors 12 includes a periodic built-in test (BIT). The BIT includes a test of the active bus which is conducted by a processor 12 transmitting a message to itself. A modification of the present invention can be applied to systems which do not have circulating buses as described below. In such a case, non-acknowledgement of a transmitted message would likely be the only way to enter the error routine.

Figure 3:
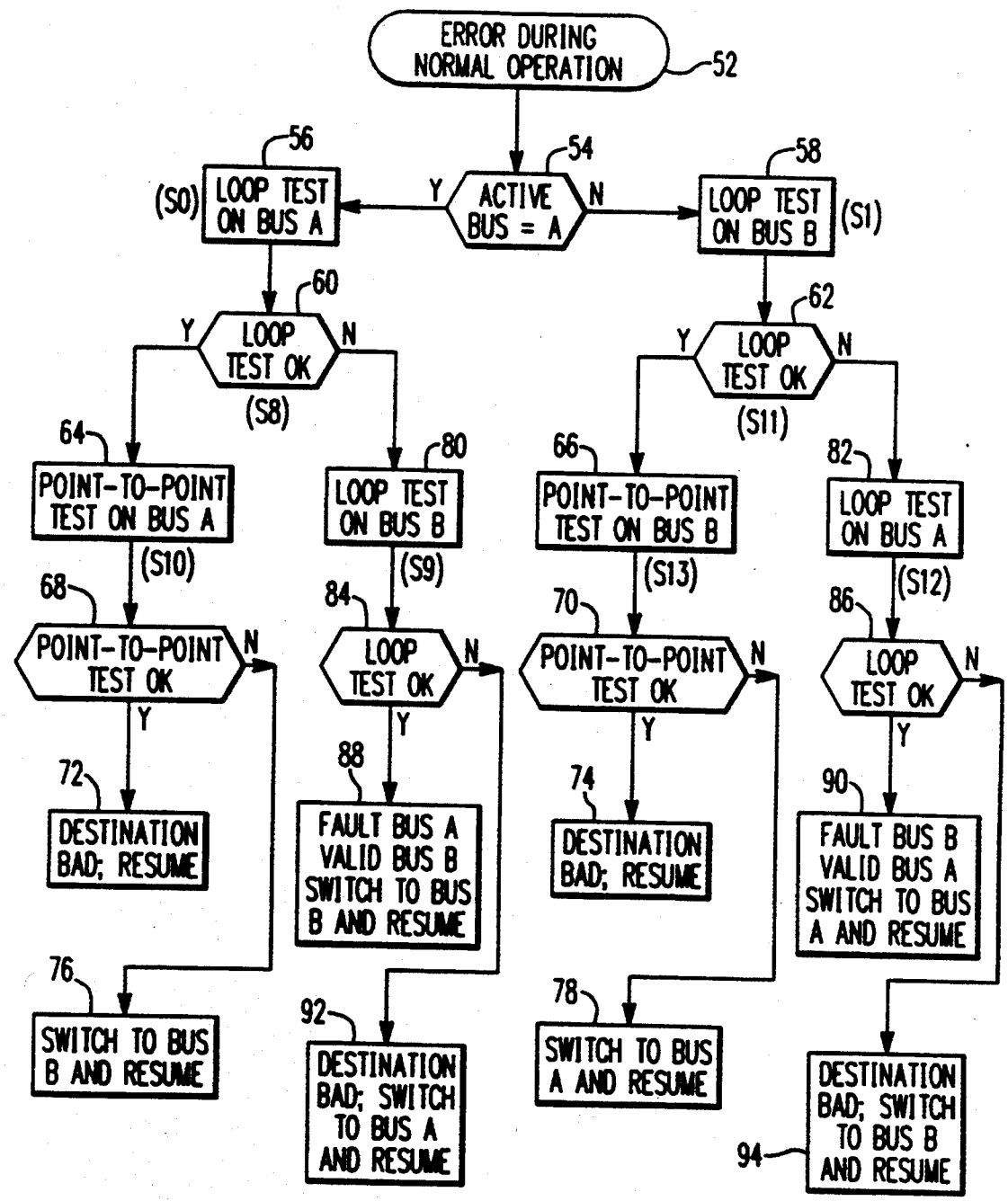
FIG. 3 is a flow chart of a method according to the present invention for switching between buses when no previous error has been detected on a bus.

The Appendix is a state table decision tree for all states in an error routine according to the present invention. During normal operation, no error will have been detected on either bus, but one of the two buses will be active; thus, the initial state upon entering the error routine will be either State 0 or State 1. A flowchart of the error routine when neither of the buses has been identified as faulty is illustrated in FIG. 3. The states in the state table of the Appendix are indicated by reference characters (S#), where # is a numeral corresponding to the state in the state table.

The processor performing the error routine will be referred to as the testing processor. Since each of the distributed processors 12 operate independently, more than one of the processors 12 may and likely will be executing the testing routine at the same time if an error occurs on the active bus, such as a short in one of the registers in one of the components of bus controller 14. A statement in the state table that one of the buses is "faulted" means that an internal flag in the testing processor indicates that the testing processor has previously determined that the bus is not operating properly. Some of the states in the state table are unlikely to occur, particularly states 2 and 5-7. However, these states are included to avoid any possible inconsistency between the state indicated by the flags and the logic performed by the error routine.

Upon entering the error routine, the first step is to determine the initial state. An error detected during normal operation 52 means that the system is either in State 0 or in State 1. Next, a determination 54 is made as to which bus is active. Then, a loop test is performed 56, 58 on the active bus. In the preferred embodiment, the loop test consists of transmitting a message from the testing processor back to the testing processor via the active bus. Other tests may be performed on different types of distributed processing systems. In States 8 and 11, a determination 60, 62 is made as to whether the test message transmission was successful. When the bus A is active, and the loop test was successful, preferably another test is performed 64 on bus A. This test could be skipped, but since an error was previously detected on the bus, preferably an additional test is made. This test is referred to as a point-to-point test, and if possible is different from the loop test. However, if no other test can be made which does not require another,single processor to be operating, the point-to-point test may be the same as the loop test. An example of a point-to-point test which does not require a single operating processor, would be to have a pair of processors, present in all systems, having identical addresses and a highly reliable protocol between the two processors determining which processor should be respond to messages.

A similar point-to-point test, or additional loop test is performed 66 on bus B if the active bus is bus B and the initial loop test 58 on bus B is determined 62 to have been successful. Regardless of which bus is being tested, in States 10 and 13 a determination 68, 70 is made as to whether the point-to-point test was successful. If the point-to-point test was successful, i.e., two successful tests have been made of the active bus, operations are resumed 72, 74. If the error routine was entered due to non-acknowledgement of a message, the destination of the message is entered 72, 74 in a table of bad destinations. This table can later be read to determine communication problems which occurred during operation of the system.

If the point-to-point test is unsuccessful, it would appear that there is some problem on the active bus, but it is not certain that the bus is faulty. Therefore, if the active bus is bus A, the testing processor switches to bus B and resumes 76. However, a flag is not set to indicate that bus A is faulted. Similarly, if bus B is the active bus and the point-to-point test is unsuccessful, the testing processor switches to bus A and resumes operation 78. Once again, no flag is set to indicate that bus B is faulted.

If the initial loop test 56, 58 is determined 60, 62 to be unsuccessful, a loop test is performed 80, 82 on the currently inactive bus. In States 9 and 12, a determination 84, 86 is made regarding whether the loop test on the currently inactive bus was successful. If the currently inactive bus is bus B, and the second loop test 80 is determined 84 to be successful, the flag is set indicating that bus A is faulted; the flag indicating the state of bus B is set to unfaulted or valid; the currently active bus and currently inactive bus are switched to use as an inactive bus and active bus, respectively, i.e., bus B becomes the active bus; and operation is resumed, as indicated in block 88. Similar operations are performed in State 12 if the currently active bus is bus B and the first loop test 58 is determined 62 to be unsuccessful, but the second loop test 82 on bus A is determined 86 to be successful as indicated in block 90. When the testing processor sets a flag indicating that a fault has been detected on one of the buses, a fault signal is output indicating the results of the testing and that the testing processor will now be operating on the other bus.

If both the first loop test 56, 58 and the second loop test 80, 82 are determined 60, 62, 84, 86 to be unsuccessful in States 9 and 12, it can be assumed that the testing processor is having problems communicating on either bus. To avoid switching between buses repeatedly, the currently active bus is maintained. When the currently active bus is bus A, the testing processor had switched to bus B to perform 80 the second loop test. Thus, the testing processor will switch back to bus A and resume operation as indicated in block 92. In addition, if the error routine was begun due to a failure to communicate with a destination processor, the address of the destination processor will be entered into a table as discussed above. Similar operations are performed 94 if the currently active bus is bus B. All of the destinations to which the processor has difficulty communicating will be stored in the table and thus the nature of the communication problem may be determined.

As indicated in the state table provided in the Appendix, operations similar to, those described above are performed if one or both of the buses have been determined to be faulty prior to entering the error routine. For example, if bus A is faulted and the currently active bus is B (state 3), a loop test is performed and a determination is made in state 14 as to whether the loop test is successful. If the loop test was good, the bad destination table is updated and operations are resumed. If the loop test on bus B was bad, a loop test is performed on bus A and transfer is made to state 15. If the previously detected error on bus A has been corrected, so that the second loop test is successful, the operations indicated in step 90 of FIG. 3 are performed. However, if both loop tests are bad, the testing processor switches back to the currently active bus B and resumes operation.

The many features and advantages of the present invention are apparent from the detailed specification, and thus it is intended by the appended claims to cover all such features and advantages of the system which fall within the true spirit and scope of the invention. Further, since numerous modifications and changes will readily occur to those skilled in the art from the disclosure of this invention, is not desired to limit the invention to the exact construction and operation illustrated and described, accordingly, suitable modifications and equivalents may be resorted to, as falling within the scope and spirit of the invention.

| APPENDIX | |
|---|---|
| State 0 | (No Fault, Active Bus is A):<br>Do Loop Test, Go to State 8 |
| State 1 | (No Fault, Active Bus is B):<br>Do Loop Test, Go to State 11 |
| State 2 | (A Faulted, Active Bus is A):<br>Switch to Bus B, Resume |
| State 3 | (A Faulted, Active Bus is B):<br>Do Loop Test, Go to State 14 |
| State 4 | (B Faulted, Active Bus is A):<br>Do Loop Test, Go to State 16 |
| State 5 | (B Faulted, Active Bus is B):<br>Switch to Bus A, Resume |
| State 6 | (A & B Faulted, Active Bus is A):<br>Do Loop Test, Go to State 18 |
| State 7 | (A & B Faulted, Active Bus is B):<br>Do Loop Test, Go to State 20 |
| State 8 | IF Loop Test was BAD:<br>Switch to Bus B, Do Loop Test,<br>Go to State 9<br>IF Loop Test was GOOD:<br>Do point-to-point Test,<br>Go to State 10 |
| State 9 | IF Loop Test was BAD:<br>Switch to Bus A,<br>Destination Bad, Resume<br>IF Loop Test was GOOD<br>Fault Bus A, Unfault Bus B,<br>Resume |
| State 10 | IF point-to-point Test was BAD:<br>Switch to Bus B, Resume<br>IF point-to-point Test was GOOD:<br>Destination Bad, Resume |
| State 11 | IF Loop Test was BAD:<br>Switch to Bus A, Do Loop Test,<br>Go to State 12<br>IF Loop Test was GOOD:<br>Do point-to-point Test,<br>Go to State 13 |
| State 12 | IF Loop Test was BAD:<br>Switch to Bus B,<br>Destination Bad, Resume<br>IF Loop Test was GOOD:<br>Fault Bus B, Unfault Bus A,<br>Resume |
| State 13 | IF point-to-point Test was BAD:<br>Switch to Bus A, Resume<br>IF point-to-point Test was GOOD:<br>Destination Bad, Resume |
| State 14 | IF Loop Test was BAD:<br>Switch to Bus A, Do Loop Test,<br>Go to State 15<br>IF Loop Test was GOOD:<br>Destination Bad, Resume |
| State 15 | IF Loop Test was BAD:<br>Switch to Bus B, Resume<br>IF Loop Test was GOOD:<br>Fault Bus B, Unfault Bus A,<br>Resume |
| State 16 | IF Loop Test was BAD:<br>Switch to Bus B, Do Loop Test,<br>Go to State 17<br>IF Loop Test was GOOD:<br>Destination Bad, Resume |
| State 17 | IF Loop Test was BAD:<br>Switch to Bus A, Resume<br>IF Loop Test was GOOD:<br>Fault Bus A, Unfault Bus B,<br>Resume |
| State 18 | IF Loop Test was BAD:<br>Switch to Bus B, Do Loop Test,<br>Go to State 19<br>IF Loop Test was GOOD:<br>Unfault Bus A, Resume |
| State 19 | IF Loop Test was BAD:<br>Resume<br>IF Loop Test was GOOD:<br>Fault Bus A, Unfault Bus B,<br>Resume |
| State 20 | IF Loop Test was BAD:<br>Switch to Bus A, Do Loop Test,<br>Go to State 21<br>IF Loop Test was GOOD:<br>Unfault Bus B, Resume |
| State 21 | IF Loop Test was BAD:<br>Resume<br>IF Loop Test was GOOD:<br>Fault Bus B, Unfault Bus A,<br>Resume |

What is claimed is:

1. A method of switching between redundant unidirectional circulating buses including active and inactive buses connecting distributed processors, comprising the steps of:

(a) detecting at least one data transmission error on a currently active bus by at least one of the distributed processors;

(b) transmitting a test message from a testing processor via the currently active bus back to the testing processor, using each of the distributed processors which detected the data transmission error in step (a) as the testing processor;

(c) independently evaluating successful transmission of the test message in each of the distributed processors used as the testing processor in step (b);

(d) transmitting the test message from the testing processor via a currently inactive bus back to the testing processor, if said evaluating in step (c) determined said transmitting in step (b) was unsuccessful;

(e) independently evaluating successful transmission of the test message in each of the distributed processors used as the testing processor in step (d); and (f) switching use of the currently active bus and currently inactive bus to use as an inactive bus and an active bus, respectively, and outputting a fault signal indicating said switching by each of the distributing processors acting as the testing processor in both steps (b) and (d), if said evaluating in step (e) determined said transmitting in step (d) was successful.

2. A method as recited in claim 1, wherein said detecting in step (a) includes detecting errors in data transmitted by the at least one of the distributed processors performing said detecting and errors initially detected by other processors as indicated by the fault signal output in step (f).

3. A method as recited in claim 1, further comprising the steps of:

(g) continuing normal operation by the testing processor if said evaluating in step (c) determines that said transmitting on the currently active bus in step (b) was successful, and (h) preventing said switching if said evaluating in step (e) determines that said transmitting via the currently inactive bus in step (d) was unsuccessful.

4. A distributed processing system, comprising:
redundant unidirectional circulating buses including active and inactive buses; and
distributed processors, each operatively connected to said redundant unidirectional circulating buses, each of said processors: (a) for detecting a data transmission error on a currently active one of said unidirectional circulating buses, and responding to detection of said data transmission error by transmitting a test message to itself via the currently active unidirectional circulating bus, (b) independently evaluating whether transmission of the test message was successful, (c) retransmitting the test message to itself via a currently inactive one of said unidirectional circulating buses if the transmission of the test message on the currently active unidirectional circulating bus was unsuccessful, and (d) switching use of the currently active unidirectional circulating bus and currently inactive unidirectional circulating bus to use as an inactive unidirectional circulating bus and an active unidirectional circulating bus, respectively, if the test message on the currently inactive unidirectional circulating bus was transmitted successfully.

* * * * *